Dec. 6, 1927.

F. A. BOWER 1,651,368

VEHICLE BRAKE

Filed Nov. 26, 1923

Inventor
Ferdinand A. Bower
By his Attorneys

Dec. 6, 1927. 1,651,368
F. A. BOWER
VEHICLE BRAKE
Filed Nov. 26, 1923 2 Sheets-Sheet 2
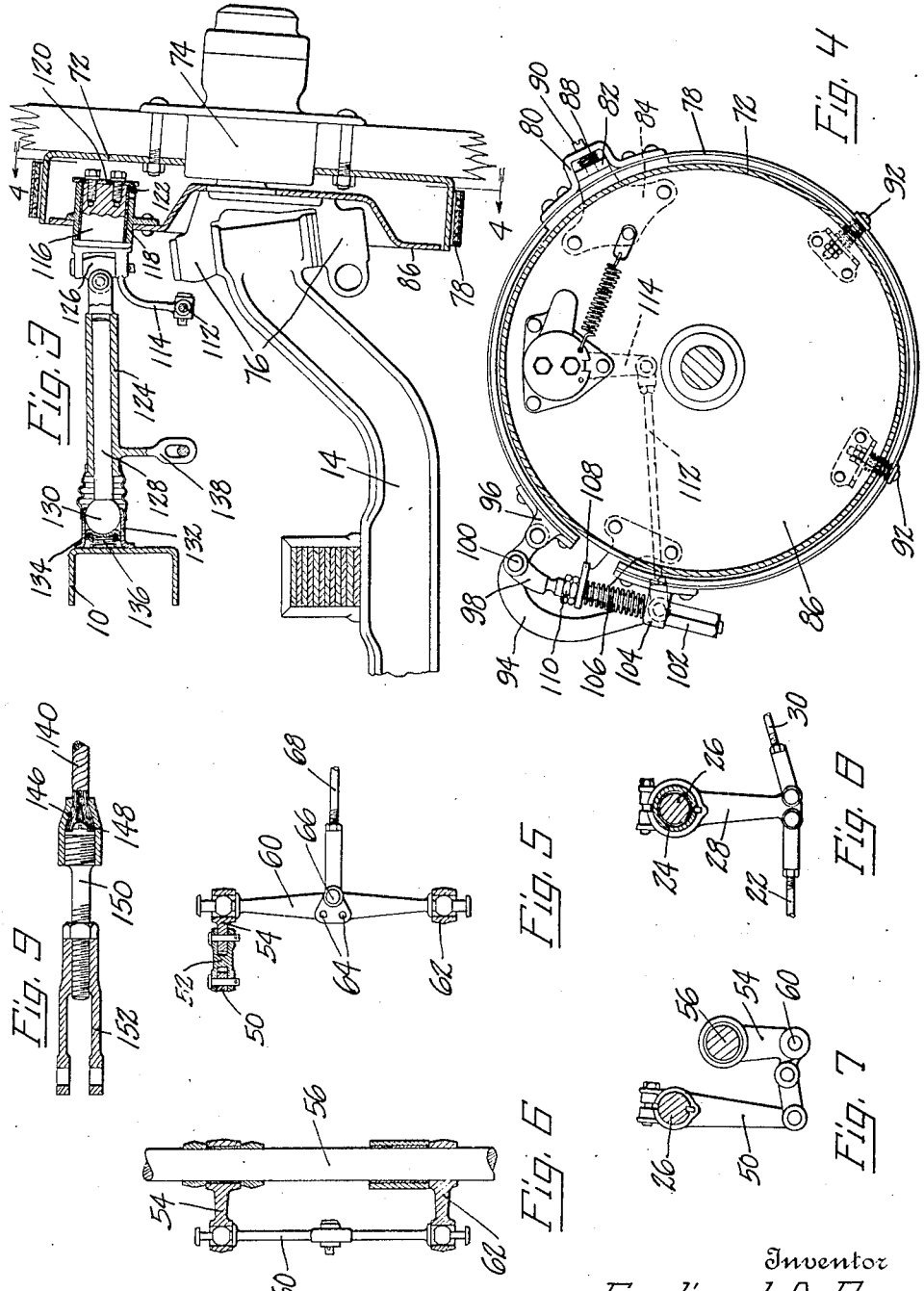
Inventor
Ferdinand A. Bower
By his Attorneys Patented Dec. 6, 1927.

1,651,368

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

VEHICLE BRAKE.

Application filed November 26, 1923. Serial No. 677,001.

This invention relates to brakes, and is illustrated as embodied in a system of four wheel brakes for an automobile.

An object of the invention is to provide an efficient set of brakes having a minimum number of parts and not affected by relative movement of the axle and the chassis frame.

From this point of view, the invention contemplates connecting a set of rear wheel brakes with an improved form of front wheel brakes by means of a novel equalizer bar operated by the brake pedal or an equivalent controlling member. The front wheel brakes in themselves present improvements, in the arrangement of an external contracting band for operation by connections from an arm on an operating shaft which has a universal joint substantially in line with the king pin about which the wheel and brake swivel in steering.

These and other objects and features of the invention, including various novel combinations of parts and desirable particular constructions, will be apparent from the following description of one illustrative embodiment shown in the accompanying drawings, in which Fig. 1 is a top plan view of part of an automobile chassis equipped with the described brakes;

Fig. 3 is a vertical transverse view through one of the front wheel brakes showing part of the front axle in rear elevation;

Fig. 4 is a section on the line 4—4 of Fig. 3 showing the brake in side elevation;

Fig. 5 is a detail top plan view showing the equalizer between the front and rear wheel brakes and showing some of the brake operating connections in horizontal section;

Fig. 6 is a vertical sectional view through the equalizer shown in Fig. 5;

Fig. 7 is a vertical section showing the connection between the rock shaft for the rear wheel brakes and its operating arm;

Fig. 8 is a vertical section showing the connection of the emergency brake lever to the rock shaft which operates the emergency brakes; and Fig. 9 is a detail view showing the manner of attaching one of the cables for the front wheel brakes to its operating means.

Figure 1:
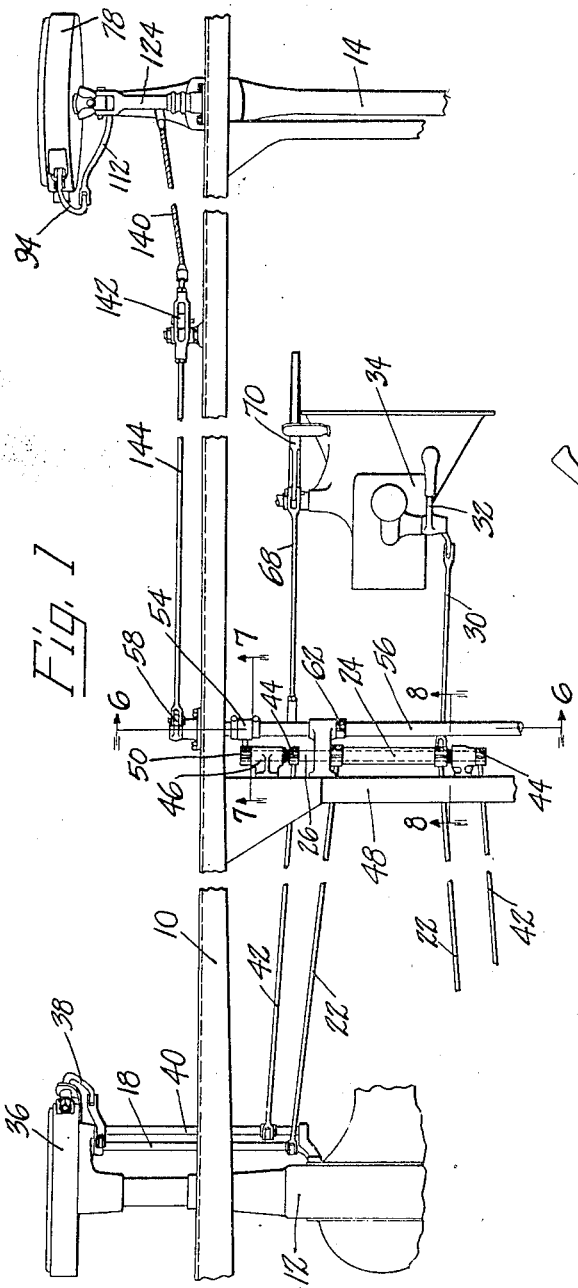

In the arrangement selected for illustration, the invention is embodied in an automobile chassis comprising a frame 10 supported in any suitable manner by springs on a rear axle 12 and a front axle 14. The rear wheels journaled on the axle 12 are provided with drums 16 inside of which are arranged internal expanding brakes connected to the emergency brake lever, and outside of which are arranged external contracting brakes connected to the service brake pedal. The emergency brakes are operated by rock shafts 18 having arms 20 connected by links 22 to a rock sleeve 24 mounted on a cross shaft 26. One of the links 22, being the upper one in Fig. 1, is connected to an arm depending from and keyed to the rock sleeve 24, while the lower link 22 in Fig. 1 is connected, as shown in Fig. 8, to a lever 28 keyed to the sleeve 24 and connected by a link 30 to the emergency brake lever 32 which is supported on the transmission 34 in the usual manner.

The rear service brakes comprise bands 36 arranged to be contracted by toggle mechanism 38 operated by rock shafts 40 connected by links 42 to arms 44 keyed to the cross shaft 26 which is supported in brackets 46 carried by a cross member 48 of the chassis frame. The cross shaft 26 also has keyed thereto an operating arm 50 (Figs. 1, 5 and 7) connected by a link 52 to an arm 54 loosely mounted on a second cross shaft 56 extending beyond the side members of the chassis frame at opposite sides and being there provided with upwardly extending arms 58 operating as described below to apply the brakes on the front wheels. It will be seen that operation of the rock shaft 56 will apply the front wheel brakes, while operation of the lever 54, freely swinging on the rock shaft 56, will apply the rear wheel brakes.

Figure 2:
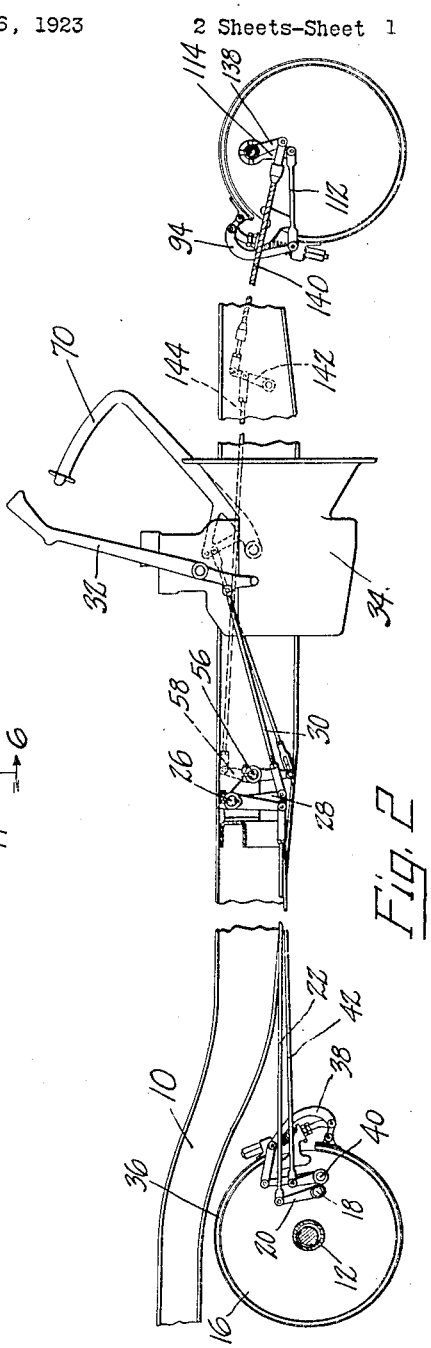
Fig. 2 is a side elevation of part of the chassis shown in Fig. 1.

According to one feature of the invention, the operation of the front and rear wheel brakes in this manner is equalized by providing an equalizer bar 60 connected at one end (Figs. 5 and 6) to the arm 54 which operates the rear wheel brakes, and connected at its opposite end to an arm 62 keyed to the shaft 56 which operates the front wheel brakes. The equalizer bar 60 is provided at its central portion with openings 64, any one of which may be arranged by turning the bar about its longitudinal axis to receive a bolt 66 connecting the bar to a link 68 operated by the service brake pedal 70. By this arrangement the link 68 may be connected to the equalizer bar at different points in its length to distribute the braking pressure differently between the front and rear wheel brakes. As shown in Fig. 2, the brake pedal 70 may be provided with several different holes which permit the link 68 to be attached thereto at different distances from the fulcrum of the pedal.

The front wheel brakes comprise drums 72 carried by the front wheels 74 journaled on the spindles of knuckles 76 swiveled to the opposite ends of the front axle 14, by the use of king pins or in any other suitable manner. An external contracting band 78 surrounds each drum 72 and has riveted thereto a U-shaped anchor member 80 embracing the anchor 82 formed on one end of a bracket 84 carried by a plate 86 supported on the knuckle 76. A spring 88 confined between the anchor 82 and member 80 urges the band outwardly to an idle position determined by an adjustable stop 90 threaded in the anchor 82 and having a head engaged by member 80. The band is also provided in the usual manner with spring devices 92 yieldingly urging the band away from the drum. The band is contracted into frictional engagement with its drum by a toggle lever 94 pivotally connected to a lug 96 carried by one end of the band, and by a link 98 pivotally connected to the toggle lever at 100 and having an adjustable abutment 102 engaging the perforated lug 104 carried by the opposite end of the brake band. These parts are urged yieldingly toward idle position by a spring 106 surrounding the link 98 and confined between the perforated lug 104 and the perforated stationary bracket 108 secured to the plate 86. The idle position of the parts is adjustably determined by a suitable stop such as lock nuts 110 threaded on the link 98 in position to engage the bracket 108.

Each of the toggle levers 94 is connected by a rigid link 112 with an arm 114 depending from a flexible operating shaft rocked by connections from the corresponding arm 58. In the arrangement shown, each arm 114 is integral with a cylindrical part 116 of the flexible shaft which is journaled in a bushing 118 secured to the plate 86, the end of the part 116 having attached thereto a retaining plate 120 shown as having a finger 122 bent down into a notch formed in the edge of the bushing 118 to determine the limits of movement of the flexible shaft. The flexible shaft also comprises a sleeve portion 124 connected to the cylindrical part 116 by a universal joint 126 above and substantially in line with the king pin about which the knuckle 76 swivels. The sleeve 124 is supported by a sliding rod or shaft 128 having a spherical head 130 received in a socket 132 attached to the corresponding side member of the frame 10. The head 130 is held in place in the socket by a follower 134 engaged by a spring 136.

As will be apparent to those familiar with the described or "Perrot" type of front wheel brake, the parts are so arranged that the arms 114 and the vertical axes of the universal joints 126 are substantially vertical when the brakes are on, the vertical axes of the universal joints, however, making acute angles with the axes of the king pins about which the front wheels swivel, so that in rounding a corner the outer brake is released.

Each sleeve 124 has an operating arm 138 formed with a slot to receive a head on a cable 140 connected to an idler arm 142, which is in turn connected by a link 144 with the operating arm 58. As shown in Fig. 9, the cable 140 is provided with operating connections at each end, being threaded through a generally cylindrical member 146 having a conical portion into which the end of the cable 140 is expanded or wedged by a screw 148. A connecting bolt 150 may be threaded into the member 146 above the end of the cable 140 and threaded into a bifurcated head 152 perforated to be attached in the usual manner to the corresponding operating arm such as the arm 142. The flexibility of the cables 140 is sufficient to permit the releasing action of the outer brake in rounding a corner when the outer arm 138 swings backward in a direction to cause its cable 140 to buckle.

While one illustrative embodiment of the invention has been described, it is not my intention to limit its scope to that embodiment, or otherwise than by the terms of the appended claims.

I claim:

1. In an equalizer for brakes, an equalizer bar having a pivot opening adjacent one edge, an off-center pivot opening adjacent the opposite edge, whereby the rotation of the bar about its longitudinal axis permits the attainment of lever arms of predetermined ratios.

2. A four wheel brake system comprising, in combination, front and rear wheel brakes, parallel adjacent cross shafts connected respectively to the front and the rear brakes, a pair of levers on one shaft, one keyed to the shaft and the other loose thereon, an arm on the other shaft connected to the loosely-mounted lever, a brake-controlling member, and an equalizer bar connected at opposite ends to the keyed lever and to the loosely-mounted lever and adjacent its center to the brake-controlling member.

3. A four wheel brake system for vehicles comprising, in combination, two parallel cross shafts one of which is operatively connected with the brakes of the rear wheels of the vehicle, and the other of which has an arm adjacent each end thereof, separate and independent brake applying mechanisms one operated from each arm and which mechanisms operate to apply the brakes of the front wheels of the vehicle, an equalizing member operatively connected with said two cross shafts, and a brake applying member operatively connected with said equalizing member.

4. A four wheel brake system for vehicles comprising, in combination, two parallel cross shafts having each two arms located adjacent the ends thereof, and the arms of one of which shafts are operatively connected with the brakes of the rear wheels of the vehicle; separate and independent brake applying mechanisms intermediate the arms of the other of said shafts and the brakes of the front wheels of the vehicle, and through which mechanisms said front wheel brakes are operated; an equalizing member operatively connected with said two cross shafts; and a brake applying member operatively connected with said equalizing member.

5. In an equalizer for brakes as set forth in claim 1, wherein the brake operating parts are connected at the ends of the lever by means permitting a rotation of the lever on its longitudinal axis.

In testimony whereof I affix my signature.

FERDINAND A. BOWER.